Inventor
John P. Minton

By Dallas R. Lamont
Attorney

June 6, 1939. J. P. MINTON 2,161,764
METHOD AND MEANS FOR RECORDING SEISMIC WAVES
Filed Nov. 17, 1937 3 Sheets-Sheet 2

Inventor
John P. Minton
By
Dallas R. Lamont
Attorney

June 6, 1939.  J. P. MINTON  2,161,764
METHOD AND MEANS FOR RECORDING SEISMIC WAVES
Filed Nov. 17, 1937  3 Sheets-Sheet 3
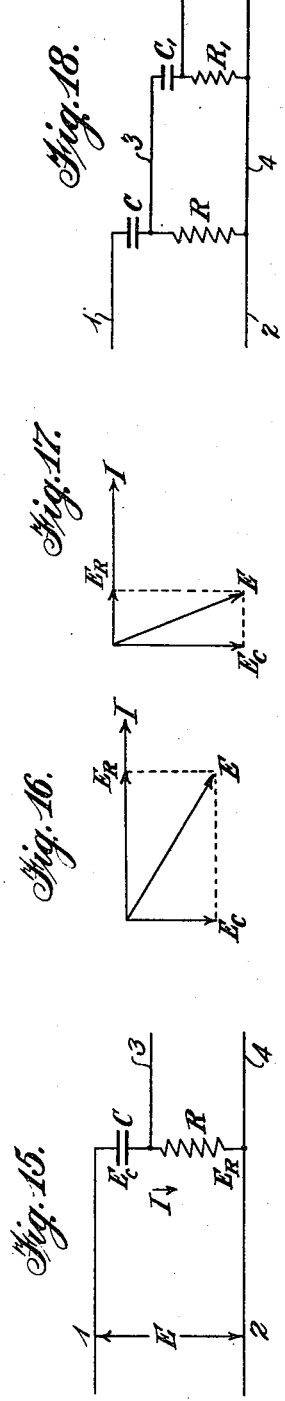
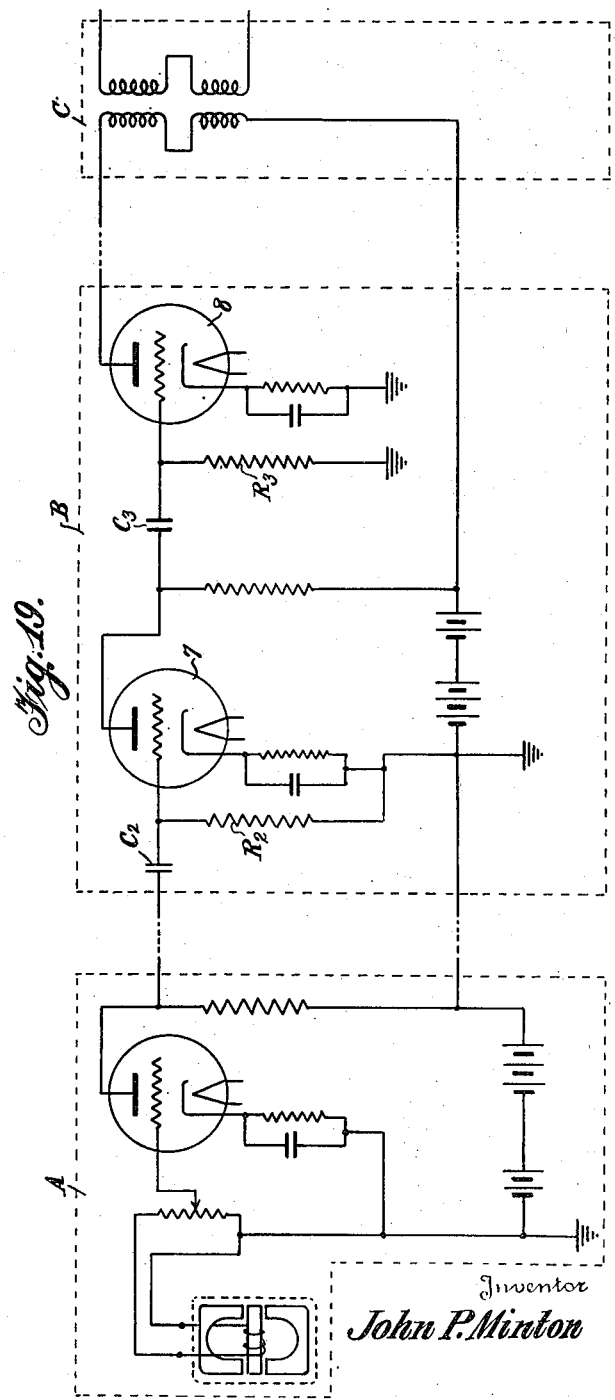
Inventor
John P. Minton
Dallas R. Lamont
Attorney Patented June 6, 1939

2,161,764

UNITED STATES PATENT OFFICE 2,161,764

METHOD AND MEANS FOR RECORDING SEISMIC WAVES

John P. Minton, Dallas, Tex., assignor, by mesne assignments, to Socony-Vacuum Oil Company, Incorporated, New York, N. Y., a corporation of New York Application November 17, 1937, Serial No. 174,972

8 Claims. (Cl. 181—0.5)

This invention relates generally to electric seismographic apparatus and a method of using the same in geophysical exploration work, and more particularly to a method and means for causing seismic waves that are being recorded to assume characteristics such that the initial impulses produced by the wave trains, such as those reflected from subsurface strata, can be recorded more definitely on a seismogram.

With the methods and apparatus heretofore employed in recording seismic waves, it has been very difficult to ascertain exactly at what instant seismic waves, which have been reflected from subsurface strata, begin to arrive at the detecting instrument, or geophone. In the use of seismographic apparatus for geophyical exploration work a charge of dynamite is usually exploded at the bottom of a relatively deep hole in the earth, generally referred to as the "shot-point". The instant of the explosion is detected and recorded on a moving film or seismogram by suitable means. The seismic waves generated in the earth by the exploding charge travel outwardly in all directions from the "shot-point". Portions of the waves travel downwardly into the earth and arrive at strata of material capable of reflecting them. Portions of these reflected waves then travel upwardly and set into vibration geophones or seismometers placed at or near the surface of the earth for the purpose of recording such waves. It is desirable to record exactly the instant of arrival at the geophone of the initial or first impulse caused by the waves that are reflected from the various reflecting strata. If this recorded instant cannot be determined definitely from the seismogram, the depth of the bed, as computed from the seismogram readings, may be substantially in error, for the wave velocity is very high, ranging sometimes between ten thousand and fifteen thousand feet per second, so that a small error in the seismogram reading may introduce a considerable error into the computed depths.

When the waves reach the geophone it is caused to vibrate, and thus by suitable design a voltage is generated by the geophone, and this voltage is recorded by a galvanometer on the above mentioned moving photographic film or sensitized paper after it has been amplified through several stages of amplification. The trace recorded on the photographic film then is a record corresponding to the voltage wave generated by the geophone when actuated by the seismic waves.

For accurate results, as above stated, it is necessary to record correctly the instant of arrival of each reflected train of waves which originated at the "shot-point". It must be borne in mind that waves from positions or points other than those on the particular reflecting horizon are also causing the geophone to vibrate and generate a voltage. An example of this phenomena is where waves traveling directly through the surface of the earth reach the geophone before, at the same time, and after the reflected waves have caused it to vibrate. Therefore, it is frequently difficult or impossible to determine from the appearance of the recorded wave train on the seismogram the exact instant when the first part of the wave energy reflected from a particular stratum reaches the geophone. From inspection of the record it is usually evident that the reflected wave has reached the geophone, but the instant of its arrival frequently is so obscure as to preclude accurate determination.

The present invention provides means for emphasizing and rendering more definite the record of the instants at which respective wave trains arrive at the geophone. When a seismic wave arrives at the geophone, a transient voltage is set up, and this type of voltage is not a simple but a transcendental function of some type. It is of complex wave shape and arrives at the geophone with very low amplitude and builds up to a maximum an instant of time later. A train of waves of varying phase and frequency follows. As a matter of fact, changes in phase and frequency are present in the build up of the wave to its maximum amplitude. By means of this invention, one is enabled to make an exact record of the instant at which the first impulse of the reflected seismic wave vibrates the geophone. This is accomplished, according to the invention, by electrically taking the derivatives of the respective wave trains arriving at the geophone. As evidenced by the illustrative records shown in the drawings, the frequency of the derivative of the initial impulse has been stepped up, as compared to that of the original wave. This sharpens the first break, that is, gives a more definite and accurate record of the instant of arrival at the geophone of the first impulse of energy of each arriving wave train.

In some areas it is desirable to record reflected seismic waves from closely spaced reflecting strata. By former methods and apparatus this has been for the greater part impossible, due to the attenuation of the reflected wave train, which tends to obscure reflections from the next deeper bed that it is desired to explore. The derivative system, as disclosed herein, makes possible the recording of reflections from closely spaced strata by decreasing the period of time in which the energy from the preceding reflected wave train affects the galvanometer.

It is well known that a seismic impulse created by an explosion divides itself into a plurality of individual waves which travel in the subsurface of the earth by following various trajectories and form direct, reflected, refracted and diffracted waves. Each of these individual waves is characterized by a definite frequency or frequency range. Thus, ordinarily the reflected waves have a frequency within the range of 30 to 100 cycles per second, while the waves corresponding to the direct, diffracted and refracted waves are obtained mainly within the lower frequency ranges, and the waves resulting from other disturbances, such as wind, are contained mainly within the higher frequency ranges.

In the art of seismic reflection prospecting it is of particular importance to isolate the reflection waves which convey valuable geological information but are often disturbed or masked by the other waves, such as the direct, refracted and diffracted waves.

One of the well-known expedients used in the art consists in designing geophones in such a manner as to reproduce the "reflection" frequencies without any possible distortion and to damp out the undesirable frequencies which represent mainly the contribution due to other waves. It is, however, apparent that the assumptions upon which the use of these geophones is based are only approximately true in view of the fact that there is no very definite and precise "reflection band" which would comprise all the reflection frequencies and would exclude all other frequencies. What is usually recognized as a "reflection band" comprises not only the reflected waves but includes also a substantial contribution due to the interfering waves and consequently the problem of identifying the reflection waves has not been definitely solved by this procedure. The present invention has as its essential purpose to alter the waves contained within the "frequency range" in such a manner as to emphasize the contribution due to the reflected waves within the frequency range. The prior practices consisted in recording the "reflection frequencies" with the least possible distortion. The present invention is a departure from the prior practice in that it abandons completely the prior tendency of keeping the waves contained within the reflection band without any possible distortion. On the contrary, the present invention has as an object to produce a willful distortion of the waves in such a manner as to emphasize the desirable reflected waves. In view of the fact that the reflected waves located within the frequency band are characterized by higher frequencies, and the undesirable and masking waves are characterized by lower frequencies, the most appropriate method of emphasizing the desirable waves would consist in distorting all the waves within the reflection band in such a manner as to emphasize the higher frequencies and to increase their magnitude as compared with the magnitude of the lower frequency interfering waves.

It is well known that disturbances such as seismic vibrations may be, in the first approximation and if taken over a relatively short time interval, considered as a periodic function and developed into a Fourier's series, $$f(t) = a_1 \sin(wt+\theta_1) + a_2 \sin(2wt+\theta_2) + a_3 \sin(3wt+\theta_3) + \ldots$$

where $f(t)$ is a function representing the earth vibrations, $a_1, a_2, a_3$ are the amplitudes of the components having frequencies $w, 2w, 3w \ldots$ respectively and $\theta_1, \theta_2, \theta_3$ represent the phase relationship between these components.

By differentiating the function $f(t)$ we obtain another function which has the following Fourier's representation:

$$\frac{df(t)}{dt} = wa_1 \cos(wt+\theta_1) + 2wa_2 \cos(2wt+\theta_2) + 3wa_3 \cos(3wt+\theta_3) + \ldots$$

By comparing the functions $f(t)$ and $$\frac{df(t)}{dt}$$

it may be noticed that the components having higher frequencies are more emphasized in the function $$\frac{df(t)}{dt}$$

than in the function $f(t)$. Thus, for instance, in the original function $f(t)$ the amplitude of the second harmonic is $$\frac{a_2}{a_1}$$

times that of the fundamental and the amplitude of the third harmonic is $$\frac{a_3}{a_1}$$

times that of the fundamental. On the other hand, it may be noticed that in the function $$\frac{df(t)}{dt}$$

which has been obtained by the differentiating $f(t)$, the amplitude of the second harmonic is $$\frac{2a_2}{a_1}$$

times that of the fundamental and the amplitude of the third harmonic is $$\frac{3a_3}{a_1}$$

times that of the fundamental. It is, therefore, obvious that the function $$\frac{df(t)}{dt}$$

has the higher harmonics emphasized more than in the function $f(t)$ and in general, the process of differentiating a periodic function has an effect of emphasizing the amplitudes of higher harmonics by multiplying the above harmonics by a factor which is proportional to the frequencies of these harmonics. This effect also emphasizes higher frequency when the phase distortion is less in the recording equipment with consequent increase of initial emphasis on the resultant wave.

The present specification describes electrical circuits which "differentiate electrically" the voltages representing seismic waves. It has been explained in the preceding paragraphs that the differentiation emphasizes reflection and consequently the output voltages of the differentiating circuits give seismographic records in which the reflected waves are more identifiable.

It is apparent that this invention originates a new trend in the seismic prospecting art by introducing a willful distortion of the frequency spectrum of the seismic waves in a manner as to emphasize the frequencies which are of particular value in obtaining useful results.

The inventor is well aware that in the prior art filtering circuits have been used in order to eliminate some undesirable frequencies. He wishes to emphasize, however, a very important distinction betwen his method and the method involving filtering circuits. In the methods in which electrical filters are used, the frequencies which are eliminated by filtering action are either in the extreme branch of higher or lower frequencies and on the other hand the present analysis is concerned mainly with the interfering frequencies which are very close to the frequencies of reflected waves and which can not, therefore, be eliminated without damaging considerably the records of the reflected waves.

Another aspect of the present invention consists in deriving some more definite physical character of the nature of the seismic waves. The geophones used ordinarily for recording earth vibrations are generally designed so as to give output voltages which represent only a certain character of the wave motion, such as, for instance, a displacement or a velocity or an acceleration. By introducing the derivating circuits described in the specification we may derive from the geophone output valuable additional information as to the character of the wave motion. Thus, for instance, by introducing a derivative circuit we may translate the geophone voltage representing displacement into a voltage representing velocity of the earth motion, or we may translate the geophone voltage representing velocity into a voltage representing acceleration, or by introducing two derivating circuits in cascade we may translate the geophone voltage representing displacement into a voltage representing acceleration.

This invention further contemplates the willful distortion of the geophone voltages in order to emphasize the higher frequencies which characterize the reflection wave.

Still another object of the invention is to derive additional information concerning the character of the seismic wave such as, for instance, determining the velocity or acceleration of the earth motion in case the geophone output represents the displacement.

Therefore, the primary object of this invention is the provision of a method and means for producing definite indications of the time of arrival of the first energy which has been reflected from subsurface strata.

Another object of this invention is in the provision of electric seismograph apparatus and method which will definitely record reflections from relatively closely spaced strata, and which will definitely record reflections which arrive during or immediately following waves from other points, such as direct traveling waves.

Still another object of this invention is in the provision of a unit which may be used in conjunction with conventional apparatus such as geophones and standard amplifiers, or may be incorporated into the amplifier as an integral part thereof.

Other objects and advantages will become apparent when the following detailed description is viewed in connection with the accompanying drawings in which:

Figure 15 is the circuit diagram for a single derivative taking stage in accordance with this invention, showing the output leads connected across the resistance.

Figure 16 is a diagram showing the voltage and current relationships in a circuit of the type shown in Figure 15.

Figure 17 is a diagram showing the manner in which E approaches $E_c$ with a decrease in resistance, in a circuit of the type shown in Figure 15.

Figure 18 is a circuit diagram showing two derivative taking stages in accordance with this invention.

Figure 19 is an illustration of an amplifier circuit to which has been added two derivating stages followed in each instant by a stage of audio amplification, in accordance with this invention.

Figure 1:
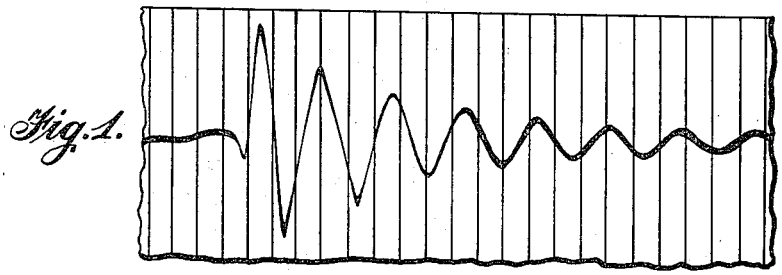
Figure 1 is an illustration of an actual seismogram showing a wave train recorded thereon.
Figure 2:
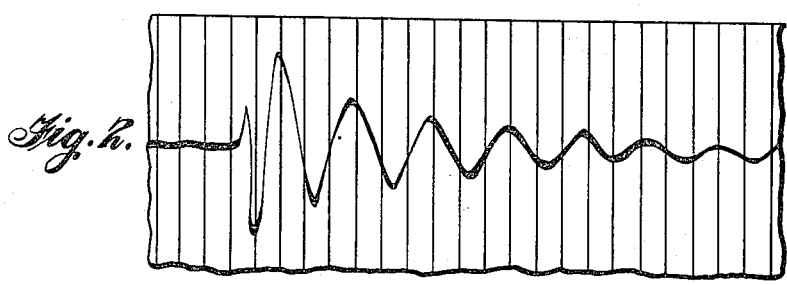
Figure 2 is an illustration of a seismogram showing the effect of taking the first derivative electrically of the wave shown in Figure 1.
Figure 3:
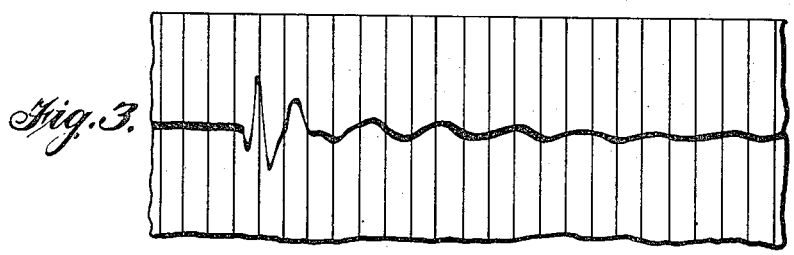
Figure 3 is an illustration of a seismogram showing the effect of taking the second derivative electrically of the wave shown in Figure 1, that is, the electrically taken derivative of the wave shown in Figure 2.
Figure 4:
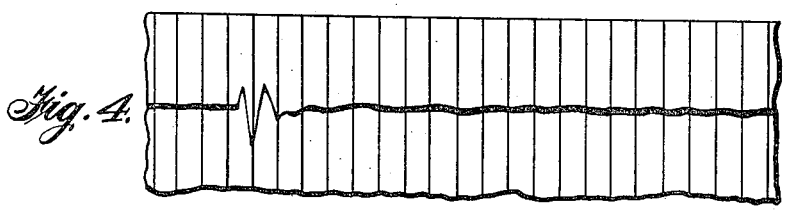
Figure 4 is an illustration of a seismogram showing the effect of taking the third derivative electrically of the wave shown in Figure 1.
Figure 5:
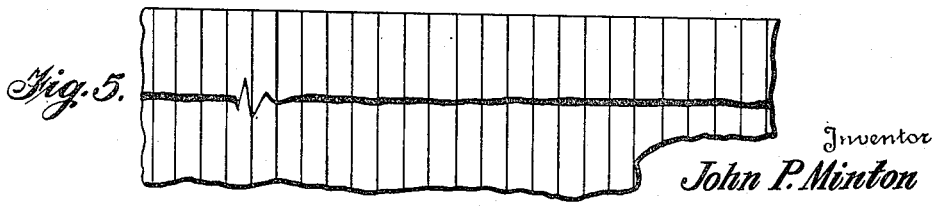
Figure 5 is an illustration of a seismogram showing the effect of taking the fourth derivative electrically of the wave shown in Figure 1.
Figure 6:
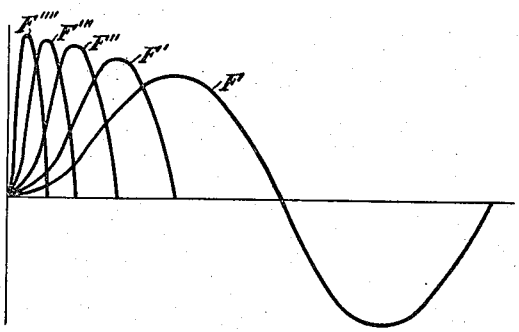
Figure 6 is a group of curves representing the function and the first, second, third and fourth derivatives of the function, showing how the slope of this type of function increases with an increasing number of derivatives.

Referring to the drawings in detail, and in particular to Figure 1, there is illustrated a trace of an electric wave recorded with instruments which do not employ the derivating circuits of this invention. It will be noted that although this illustrated wave is of greater amplitude than the one illustrated in Figure 2, the point at which the first energy is recorded by the wave of Figure 2 is more definite than that in the curve illustrated in Figure 1. The curve in Figure 2 is a similar wave to that of Figure 1, differing only in that it has been passed through one electrical derivating stage. The illustration in Figure 3 is of a wave resulting from the same energy utilized in the production of the curve in Figure 1, but having been passed through two derivating stages. It will be noted that the time of arrival at the detecting instrument of the first energy is much more definite than that disclosed in Figure 1. Figure 4 is illustrative of a wave produced by the same energy as that in Figure 1, after having been passed through three derivating stages, and Figure 5 is a similar wave which has been passed through four derivating stages. From a comparison of these wave forms, it will be noted that the point at which the first energy is recorded is by this method made very definite, and additionally that instead of the wave train being attenuated for some twenty or more timing cycles (represented by the parallel transverse lines) it dies out practically completely within one and one-half cycles. Therefore the application of this invention to seismographic work for the purpose of recording reflections from closely spaced beds readily becomes apparent.

Figure 7:
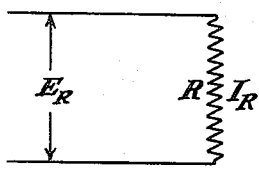
Figure 7 is a simple series resistance circuit.
Figure 8:
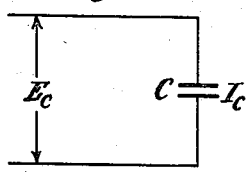
Figure 8 is a simple series capacitance circuit.
Figure 9:
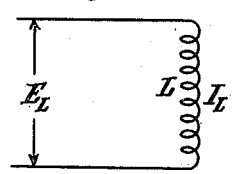
Figure 9 is a simple series inductance circuit.

Reference is now had to the elements of alternating circuits for the purpose of clearly explaining this invention and the results produced in practicing the same. The evolution or development of the derivating circuit can best be understood by first considering the simple resistance, capacitance, and inductance circuits as illustrated in Figures 7, 8, and 9 in which the respective elements and quantities are given conventional representative letters. The current and voltage relationships in these circuits are represented by the respective instantaneous current and voltage diagrams of Figures 10, 11, and 12. In the circuit of Figure 7, the current is in phase with the voltage. Assuming a pure capacitance circuit in Figure 8, the current will lead the voltage by a phase angle of 90 degrees. In Figure 9, assuming a pure inductance circuit, the current will lag behind the voltage by a phase angle of 90 degrees.

Figure 10:
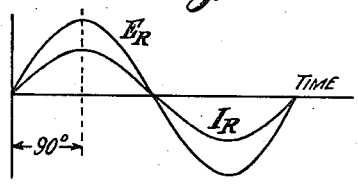
Figure 10 is an illustration of the instantaneous values of current and voltage showing their relationship in a simple series resistance circuit.
Figure 11:
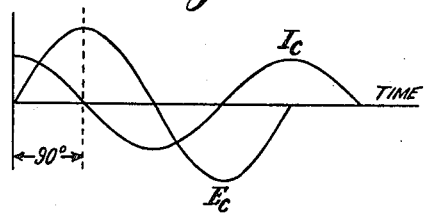
Figure 11 is an illustration of the instantaneous values of current and voltage, showing their relationship in a simple series capacitance circuit.
Figure 12:
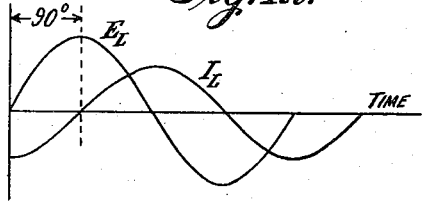
Figure 12 is an illustration of the instantaneous values of current and voltage showing their relationship in a simple series inductance circuit.

Furthermore, considering Figure 7, when a voltage $E_R$ is impressed across the resistance R, a current $I_R$ flows through R. In time relationship the current and voltage are always in phase, as shown in the diagram of Figure 10, and $$\frac{E_R}{R} = I_R$$

that is, the current through a resistance is proportional to the impressed voltage. However, in the circuit of Figure 8, when a voltage is impressed across a condenser, a leading current will flow through the circuit. In this case, as illustrated in Figure 11, the current $I_C$ leads the voltage $E_C$ by 90 degrees. Here $$C\frac{dE_C}{dt} = I_C$$

that is, the current through a capacitance is proportional to the time derivative of the voltage across the capacity. Additionally, in the case illustrated in Figure 9, a voltage $E_L$ is impressed across an inductance L, causing a current $I_L$ to flow through the inductance. This $I_L$ lags behind the voltage by a time phase angle of 90 degrees, as shown in Figure 12. In this case $$I_L = \frac{E_L}{L}\int dt$$

that is, the current flowing through the inductance is proportional to the time integral of the impressed voltage.

Figure 13:
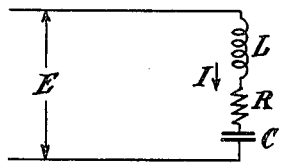
Figure 13 is a simple series inductance, resistance and capacitance circuit.
Figure 14:
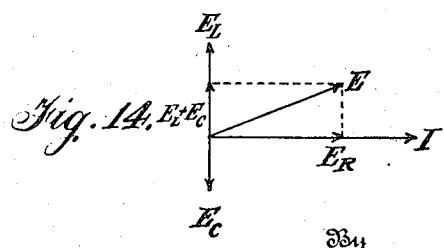
Figure 14 is a diagram illustrating the current and voltage relationship in the circuit shown in Figure 13.

Therefore, if we have a resistance, capacitance and inductance connected in series and a voltage impressed across the entire combination, as illustrated in Figure 13, we have $$E = E_R + E_C + E_L \text{ or } E = RI + \frac{1}{C}\int I dt + L\frac{dI}{dt}$$

the same current flowing through all the elements. Now if we tap across the L, we get a voltage proportional to the time derivative of the current; across the C, a voltage proportional to the time integral of the current; and across the R, a voltage proportional to the current. This relationship is illustrated in Figure 14.

With an arrangement of elements such as is illustrated in Figure 15, by impressing a given voltage E across the circuit at the points 1 and 2, a current I will flow through the circuit. The value of this current will be equal to $$C\frac{dE_C}{dt}$$

and also equal to $$\frac{E_R}{R}$$

This relationship can be illustrated as shown in Figure 16. Now if the capacitance and resistance are both made small, so that, at the frequencies used, the voltage drop across C is far greater than across R, then a condition is reached where the current I is leading the voltage E substantially 90 degrees and is substantially proportional to the time derivative of the applied voltage E. This is illustrated in Figure 17.

Therefore, we get a small component of the voltage across the resistance R in substantial proportion to the derivative of the impressed voltage. This voltage $E_R$ is obtained at the terminals 3 and 4. Then by connecting across the terminals 3 and 4 another condenser $C_1$ and resistance $R_1$, as shown in Figure 18, we have a second circuit by means of which the second derivative can be taken. The voltage measured at points 5 and 6 across $R_1$ is substantially proportional to the derivative of the voltage measured at points 3 and 4 across R, which voltage in turn is substantially proportional to the derivative of the voltage impressed at the terminals 1 and 2.

By adding more derivative taking stages in this manner any desired number of derivatives can be taken that are necessary to produce a definite time indication of the arrival of reflected waves at the detecting instrument. A derivating circuit having as many as six derivating stages has been built and operated successfully.

Upon adding derivating stages, the amplitude or intensity of the signal caused by the wave train would, after a number of stages, entirely die out or become so weak that it could not be recorded. Therefore, to overcome this difficulty there has been interposed between each derivating stage an amplifying stage. This is shown in the circuit diagram in Figure 19. Referring to Figure 19, there has been shown at A an illustration of a conventional geophone with one stage of amplification. At B two derivating stages are shown with two stages of amplification disposed alternately with the derivating circuits. C is a diagrammatical indication that the derivating unit may be either connected to, or made integral with, the input of a conventional vacuum tube amplifier. Since the geophone and one stage vacuum tube amplifier, as shown in A is of conventional design, it is not believed necessary to go into a detailed description of its elements and operation.

Referring to the B portion of the circuit, condenser $C_2$ and the resistance $R_2$ comprise the first derivating stage. The voltage across the resistance $R_2$ is impressed across the grid and cathode of the vacuum tube 7 which has the conventional self biasing cathode. The voltage thus impressed across the grid and cathode of the tube 7 is made a substantial derivative of the amplified voltage from the geophone. The vacuum tube 7 functions to amplify this derivative. The amplified voltage is then impressed across the second derivating stage that consists of the condenser C3 and the resistance R3. This derivating stage will electrically take the derivative of the derivative of the original amplified voltage, thereby tending to further sharpen the initial impulse of the reflected wave. The derivated voltage from this derivating stage is further amplified by the vacuum tube 8.

In order to bring the derivated signal which has passed thus far through the derivating circuit up to the amplitude that it is desired to record on a galvanometer, the signal can then be passed through a conventional amplifier as illustrated diagrammatically in the C portion of the circuit shown in Figure 19. Not only is the initial impulse of the signal sharpened by having passed through the two derivating stages but the attenuation of the reflected wave train has been greatly increased, making it possible to record reflections following closely behind a preceding reflection or other wave.

Although this invention has been described in connection with two derivating stages, any desired number depending upon the definition required in the results, may be employed. In like manner, the use of interposed amplifying stages is optional. Either one or both may be eliminated or as many stages of amplification added as is found necessary to bring the amplitude of the signal up to normal.

Additionally, although the derivating unit has been described as separate and distinct from the amplifier, these derivating stages can be built directly in the amplifier as an integral part thereof.

I claim:

1. An electric seismograph comprising in combination a vacuum tube amplifier, a geophone connected to the input of said amplifier, a galvanometer connected to the output of said amplifier, timing means associated with said galvanometer, and means alternately disposed between successive stages of the amplifier for electrically taking a plurality of derivatives of a signal when passing through the amplifier and amplifying them, whereby the wave front of the signal is given predetermined characteristics.

2. In combination with an electric seismograph means for creating seismic waves in the earth's surface, means for generating voltage waves in sympathy with said seismic waves, and means for electrically taking a plurality of derivatives of the voltage waves to emphasize the higher frequencies whereby the wave front is rendered abrupt and their attenuation is reduced.

3. The method of geophysical exploration that comprises creating a seismic disturbance, detecting vibrations forming a part thereof at a point spaced therefrom, distorting the detected vibrations to make the wave fronts thereof more abrupt by taking a mathematical derivative of the said detected vibrations and making a record solely of said mathematical derivative of said vibrations.

4. The method of geophysical exploration which comprises creating seismic waves in the earth's surface, translating said waves into electrical vibrations, distorting said electrical vibrations so as to make their wave fronts more abrupt by converting them into other electrical vibrations varying solely as a mathematical derivative of the first electrical vibrations and recording the said other electrical vibrations without further alteration of their wave form.

5. The method of geophysical exploration which comprises creating seismic waves in the earth's surface, translating said waves into electrical vibrations, distorting said electrical vibrations so as to make their wave fronts more abrupt by converting them into other electrical vibrations varying solely as the rate of change of the first electrical vibrations and recording the said other electrical vibrations without further alteration of their wave form.

6. The method of seismic surveying which comprises creating seismic waves in the earth's surface, translating these waves into electrical vibrations, distorting said electrical vibrations so as to make their wave fronts more abrupt by converting them into other electrical vibrations varying substantially according to a formula:

$$\frac{d^k}{dt^k}f(t)$$

where $f(t)$ is a function representing the first electrical vibrations, $k$ is an integer, the symbol $$\frac{d^k}{dt^k}$$

denoting differentiation of the order $k$ and recording the said other electrical vibrations without further alteration of their wave form.

7. The method of geophysical exploration which comprises creating seismic waves in the earth's surface, translating these waves into electrical vibrations having various frequency components, multiplying each frequency component by an amplification factor proportional to its frequency and recording the resultant electrical vibrations without further alteration of their wave form.

8. In a system for geological surveying, means for creating a disturbance in the earth, a geophone conveniently placed at the earth's surface to receive the waves resulting from the said disturbance and translate them into electrical vibrations, derivating circuits in cascade connected to the geophone for receiving the said electrical vibrations and producing an electrical voltage representing a derivative of the said vibrations, each of the said derivating circuits producing at its output terminal a derivative of the voltage applied to its input terminal, and means for recording the said output voltage without further alteration of its wave form.

JOHN P. MINTON.

CERTIFICATE OF CORRECTION.

Patent No. 2,161,764.

June 6, 1939.

JOHN P. MINTON.

It is hereby certified that error appears in the printed specification of the above numbered patent requiring correction as follows: Page 2, first column, line 17-18, for the word "obtained" read contained; and second column, line 72, for "reflection" read reflections; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.